(No Model.) 2 Sheets—Sheet 2.
F. F. SMITH & J. W. LOCKWOOD.
PLOW SULKY.
No. 272,092. Patented Feb. 13, 1883.
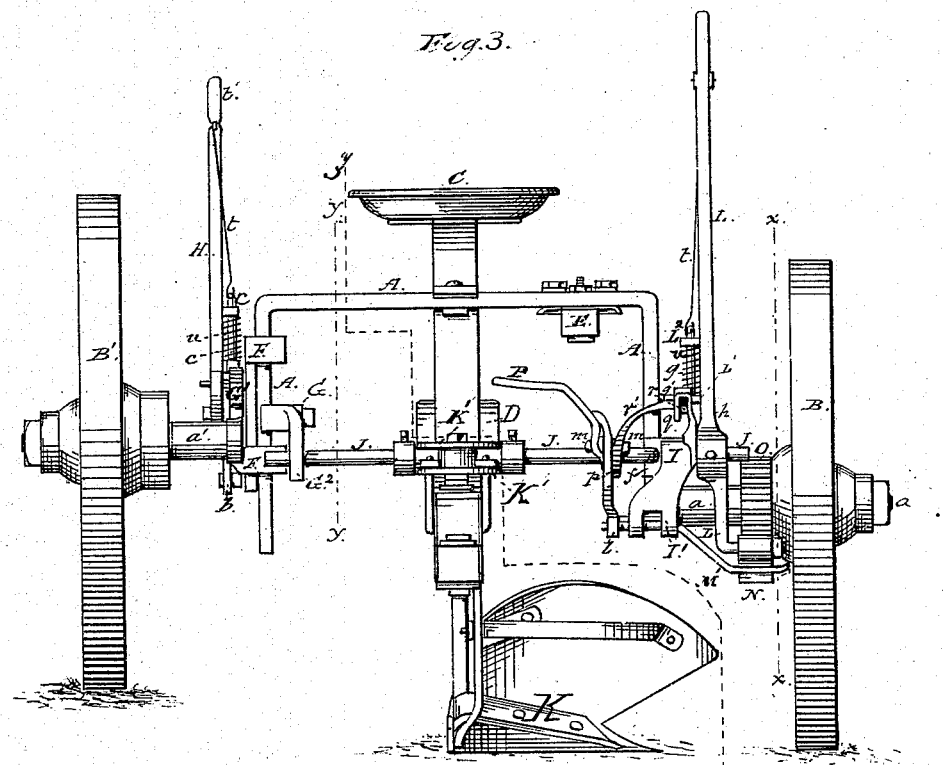
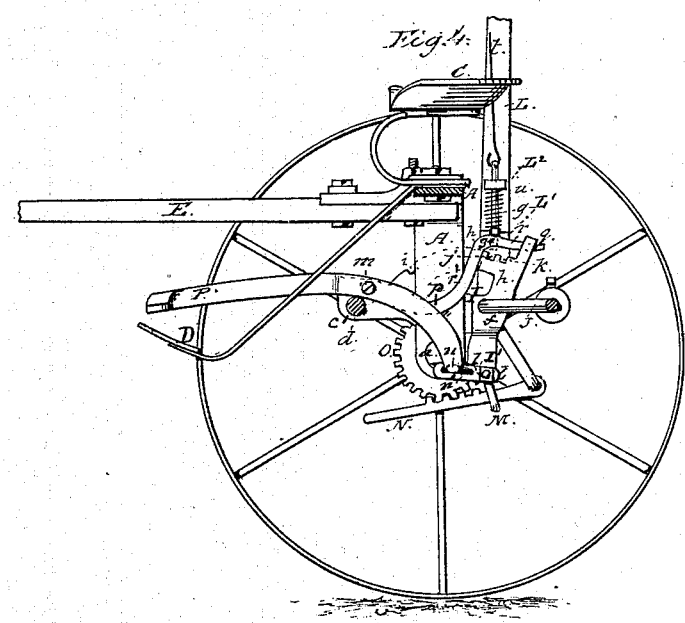
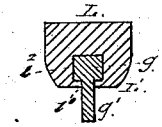
Attest:
F. W. Howard
Robt. S. Fenwick
Inventor;
Francis F. Smith
John W. Lockwood
by their attys
Fenwick & Lawrence

UNITED STATES PATENT OFFICE.

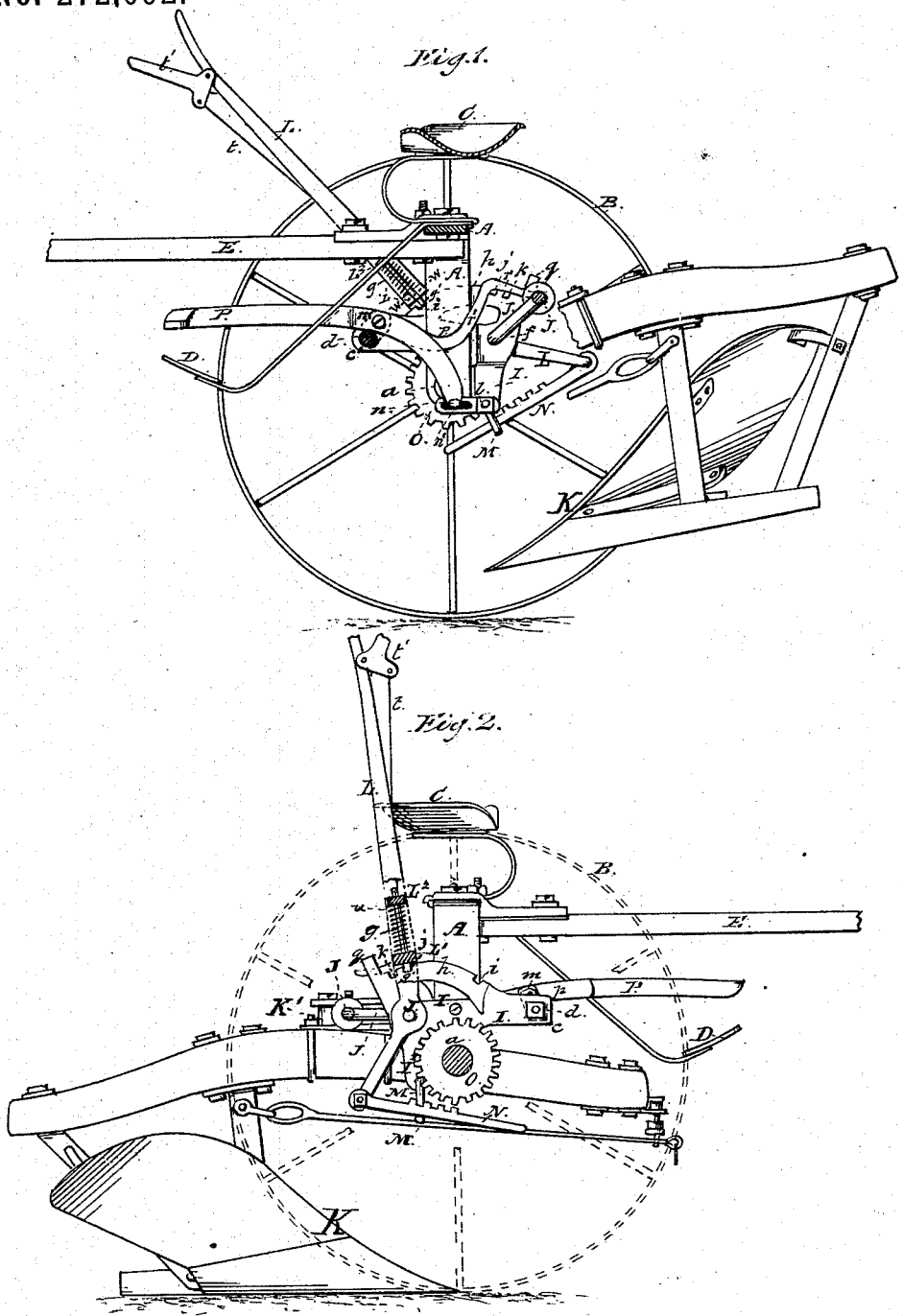

FRANCIS F. SMITH, OF SANDUSKY, AND JOHN W. LOCKWOOD, OF GYPSUM, ASSIGNORS TO THE SANDUSKY PLOW COMPANY, OF SANDUSKY, OHIO.

PLOW-SULKY.

SPECIFICATION forming part of Letters Patent No. 272,092, dated February 13, 1883.

Application filed April 27, 1882. (No model.)

*To all whom it may concern:*

Be it known that we, FRANCIS F. SMITH, of Sandusky, in the county of Erie and State of Ohio, and JOHN W. LOCKWOOD, of Gypsum, in the county of Ottawa and State aforesaid, both citizens of the United States, have invented a new and useful Improvement in Combined Power and Hand Lifts for Plow-Sulkies, with Plow attached, of which the following is a specification.

This invention relates especially to the plow-sulky with plow and power lift attached for which we applied for a patent on the 26th day of April, 1882; and the nature of our present improvements will be clearly understood from the following description, claims, and accompanying drawings.

In the accompanying drawings, Figure 1 is a vertical longitudinal section of our improvements, shown applied to a plow-sulky with a plow attached, invented by Francis F. Smith, one of the present applicants, and secured by Letters Patent dated and numbered respectively, December 7, 1880, No. 235,175, and August 10, 1880, No. 230,902. In this view, which is taken on the line $y$ $y$ of Fig. 3, the parts are seen on the left-hand side, and the locking-bolt of the hand-lever stands in the front notch of the right-hand sector-plate, and the plow is raised, and the rack-bar which gears with the toothed wheel or ring on the hub of the furrow supporting-wheel is shown as having become ungeared from said toothed wheel. Fig. 2 is a vertical longitudinal section of the same turned around and viewed from the right-hand or furrow side, the line of section being taken in the line $x$ $x$ of Fig. 3, and the furrow-side wheel, which is cut away by the section, being shown in part by dotted lines. Fig. 3 is a rear view of the plow-sulky with plow attached, and as adjusted for plowing. Fig. 4 is a vertical longitudinal section in the line $z$ $z$ of Fig. 3, looking toward the land side and showing the treadle-lever depressed, locking-bolt raised by an extended portion of the treadle-lever, and the said locking-bolt of the hand-lever out of the locking-notch of the right-hand sector, and the rack-bar in gear with toothed wheel of the right-hand supporting-wheel. Fig. 5 is a horizontal detail section of the locking-lever and its bolt in the line $w$ $w$ of Fig. 1, and Fig. 6 is a detail front view of the locking-bolt.

Similar letters of reference in the several views indicate corresponding parts.

The plow-sulky represented consists of an arched axle-bar, A, provided with a fixed axle-arm, $a$, a furrow-side supporting-wheel, B, an adjustable axle-arm, $a'$, for a land-side supporting-wheel, B'. The arched axle-bar has a seat, C, with a foot-support, D, and a pole or tongue, E, applied to it in the manner shown, or in any other approved manner. The axle-arm $a'$ is connected to a rear bracket of a gage-slide, F, which slides up and down on the land-side leg of the axle-bar A, and is controlled in the extent of its up-and-down movement by a stop-bracket, G, fastened to said leg of the axle-bar. The said bracket-stop has a toothed sector, G', and a perforated rear lug, G², formed on it. To the slide a link, $b$, is pivoted, and to this link the end of the ordinary lifting-lever, H, carrying an ordinary locking-bolt, $c$, is connected by a pivot-pin, said lever, as heretofore, being pivoted to the center supporting-bolt of the sector G'. The devices described serve as the means by which the land-side wheel B' is leveled or adjusted to run on the land while the wheel B is in a furrow; and they are shown in the former patent hereinbefore referred to, granted to Francis F. Smith, therefore they are not claimed by us here; nor are they embraced by our invention.

On the furrow-side leg of the arched axle A a bracket, I, is firmly bolted, and to a front lug, $c'$, of this bracket, and to the center supporting-bolt of the sector G', a transverse fulcrum and stay bar, $d$, is fastened; and in a rear lug, $f$, of this bracket I and the lug G² of the bracket G is hung the cranked swinging bar J, upon which the plow K is suspended by a suitable coupling device, K', or any other suitable clipping or coupling device, and by which it is raised and lowered. The coupling device K' and its adjuncts are similar to those heretofore patented by Francis F. Smith, and our invention does not embrace the same.

To the right-hand end of the swinging cranked bar J a lifting hand-lever, L, provided with a locking-bolt, $g$, is rigidly connected, so that the said bar rolls in its lug-bearings when the lower arm of this lever is moved upward and backward, or downward and forward, these actions upon the lower arm of the lever, whether caused by horse or hand power, causing the cranked bar J to raise and lower the plow K.

The bracket I is cast with a sector, $h$, in which three notches, $i\,j\,k$, are formed, the notch $i$ serving to receive the locking-bolt $g$ when the plow is raised above the ground; the notch $j$, for receiving the locking-bolt when the plow is plowing the proper depth of furrows, and the notch $k$ for receiving the said bolt when the plow is plowing deeper, as when "striking out" or plowing the first furrow, at which time the furrow-side wheel requires to run on an unplowed surface. The unnotched portion of this sector forms an elevating-surface, by which the locking-bolt is held out of the notches until it is proper for said bolt to drop into either of the specified notches $i\,j\,k$. It is best not to notch the sector over its whole surface, for were it thus notched the proper depth of plowing might be interfered with by the locking-bolt resting in a wrong or intermediate notch; and besides this the automatic lifting action, which we have devised and which will be presently described, would be interfered with should the locking-bolt fall into any other than the proper notches.

To the lower part of bracket I a bent rocking bar or stirrup, M, is hung, and to a lateral pivot end of the lower short arm of the hand-lever L a longitudinally-sliding and vertically-swinging rack-bar, N, is loosely connected by its rear end, and upon the inner end of the hub of the furrow-side wheel B a cogged surface, O, in form of a toothed ring is rigidly fastened, so as to revolve with the hub of the wheel B around the axle-arm $a$ of the arched bar A. The rocking bar or stirrup M extends under the rack-bar N and forms an open stirrup-like support and guide for it during the time it is out of gear, and while being acted upon by the cogged surface O; and it also serves as the means by which the rack-bar is lifted and kept in gear with the said cogged surface. This rack-bar stands under the cogged surface O, so as to gear with it when it is lifted by the bar M, and it may be either straight or curved, and the number of its teeth may be just sufficient to raise the plow to the proper height for being locked up.

To the inner end of the bar M a crank-arm, $l$, which extends forward, is fastened rigidly, and to this crank-arm a treadle-lever, P, having its fulcrum $m$ in lugs of the transverse bar $d$, is loosely connected. The connection between the treadle-lever P and crank-arm $l$ is effected by means of a lateral pivot end, $n$, of the lever and an oblong slot, $n'$, in the crank-arm. By thus constructing and arranging the lever P, crank-arm $l$, and stirrup-like rocking bar M the rack-bar N can be thrown up and in gear with the cogged surface O by depressing the treadle-lever with the foot; and in order to effect the removal of the locking-bolt $g$ from either of the respective notches $j$ and $k$ by the foot-lever P, as it is depressed, said lever is provided with a bent portion, $p$, which extends backward, upward, and laterally, and then again backward, as shown, or in any other more suitable form. The upper lateral portion may be passed through an inverted-U-shaped guide, $q$, cast on the bracket I, at the rear top terminus of the sector $h$. That part $r$ of the portion $p$ of the treadle-lever P which is in rear of its lateral bend $r'$ stands under an inner lateral projecting lug, $g'$, of the locking-bolt, and when said portion $r$ is caused to rise by depressing the foot-lever P it lifts the locking-bolt $g$ by the lug $g'$ out of one or the other of the notches $j\,k$, accordingly as said bolt may be in either of said notches. The locking-bolt $g$ is wider than the lug, and while the lug moves through a narrow slot, $l'$, in a guide, L', on the upper arm of lever L, the bolt fits in an enlarged passage, $l^2$, on the right of said slot, as shown in Fig. 5, and thus while the lug extends out beyond the guide L' the bolt $g$ is guided, while its upper end is fitted in a ring-guide, L², on the upper arm of the lever L, and on the bolt between the two guides a spiral spring, $u$, is applied for keeping the bolt locked, and to the upper end of the bolt a rod, $t$, connected to a thumb-lever, $t'$, is fastened for the purpose of enabling the operator to operate the bolt by hand when it is desirable to withdraw it by hand from the notch $i$ for the purpose of lowering the plow from the position shown in Fig. 1 to that shown Figs. 2 and 3. By having the bolt $g$ of the long arm of lever L fitted to the slotted guide L' convenience for unshipping it from the guides L' L² by a simple short downward movement is afforded, and still the connection is a very secure one, quite as much so as were a closed clasp similar to L² used at L'.

As a modification of the bolt $g$, with a lug, $g'$, on its lower end, a hook or catch might be attached to the wire $t$ above the bolt, and connected by a slot or loop to the part $r$ of the treadle-lever P, and arranged to be acted upon by the foot-lever whenever this lever is depressed, or by hand, as occasion might require. Other analogous modes of applying and means for operating the locking-bolt by a depression of the foot-lever for the purpose of throwing the rack N in gear with the surface O, and by the hand for the purpose of allowing the plow to descend to the ground, and for allowing it to be raised both by horse or hand power, may be adopted without departing from our invention. For instance, the locking-bolt may be applied on a support separate from the hand-lever and still be capable of being operated both by the treadle and the hand. The treadle-lever, with its several bearing and connecting portions and the portion for operating the locking-bolt, latch, or hook, may be constructed or cast in one piece.

In operating our plow-sulky with plow attached, so as to raise the plow by horse-power, the long arm of the lever L is not used for throwing the rack N and surface O in gear. Neither is this arm of the hand-lever operated by the hand for the purpose of removing the locking-bolt when the plow is to be elevated by power, nor for placing this bolt into the proper notch when the plow has been allowed to lower by its gravity to position for starting in at the end of a furrow. With our plan we simply use the hand to unlock the bolt $g$ from the notch $i$, and this done the plow descends by its own gravity, and said bolt $g$ naturally or automatically moves back on the sector, and when it rises to the notch $j$ it drops therein. When the operator gets to the end of a furrow he applies his foot to the lever P, and thereby releases the bolt $g$ from its notch in the sector and simultaneously causes the rack to gear with the surface O, whereupon the plow is caused by the power of the horses to rise out of the ground, and while it is rising the bolt $g$ moves forward on the sector until it falls into the notch $i$ and locks the plow in the desired elevated position, holding it in this position until the plow is turned into another furrow, when the bolt is withdrawn by hand-power, the plow allowed to descend and become locked in its working position, and thus the operation goes on. About twenty pounds' pressure upon the treadle will be sufficient to lift the locking-bolt out of its notch and effect the gearing of the rack with the surface O.

With our invention the driver has his hands free for managing and guiding the team while driving out at the end of a furrow and turning the team around, and although the rack and surface O are necessarily thrown into gear by the pressure of the foot upon the treadle, and would possibly be kept in gear more positively by continuing such pressure thereon, the construction, combination, and proportions of the parts are such that the gearing-connection will be maintained even if the foot is immediately withdrawn after the parts are put in gear.

What we claim as our invention, and desire to secure by Letters Patent, is—

1. The combination of the hand-lever L, locking device $g$, toothed devices N and O, bar J, upon which the plow is hung, axle $a$, propelling-wheel B, and treadle-lever P, provided with means for simultaneously unlocking the device $g$ and throwing the toothed device N into gear with the toothed device O, substantially as and for the purpose described.

2. The treadle-lever P, provided with means whereby it is enabled to release the locking device $g$, and simultaneously operate the rack of the power-lift, substantially as and for the purpose described.

3. The locking-bolt $g$, provided with a lug, $g'$, in combination with the treadle-lever P, provided with an unlocking portion, $p$, and a rocking stirrup, M, for throwing the toothed device N into gear with the toothed gear O, substantially as and for the purpose described.

4. The locking-bolt provided with a lug, $g'$, and the hand-lever L, provided with a slotted clasping-guide, L', and a suitable closed guide, L², substantially as and for the purpose described.

5. The locking-bolt $g$, applied upon an upper rigidly-connected arm of the vibrating-bar J and the rocking stirrup M, in combination with the treadle P and the toothed bar N, the latter applied upon a lower rigidly-connected arm of the said bar J, substantially as and for the purpose described.

6. The combination of a sector provided with the notches $ij$, and having a plain surface between the notches thereon, and the locking device $g$, hand-lever, treadle, and power-lift mechanism, substantially as and for the purpose described.

FRANCIS F. SMITH.
JOHN W. LOCKWOOD.

Witnesses for Francis F. Smith:
  W. V. LATHAM,
  ARTHUR B. PHINNEY.

Witnesses for John W. Lockwood:
  C. C. PEET,
  R. HAGEL.